US009246699B2

(12) United States Patent
Lawrance et al.

(10) Patent No.: US 9,246,699 B2
(45) Date of Patent: Jan. 26, 2016

(54) METHOD AND SYSTEM FOR TESTING MULTIPLE COMPONENTS OF A MULTI-TENANT, MULTI-DOMAIN, MULTI-TIERED WEBSITE

(75) Inventors: Steven S. Lawrance, San Francisco, CA (US); Agathish Varadharajan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 200 days.

(21) Appl. No.: 13/028,961

(22) Filed: Feb. 16, 2011

(65) Prior Publication Data

US 2011/0302298 A1 Dec. 8, 2011

Related U.S. Application Data

(60) Provisional application No. 61/352,311, filed on Jun. 7, 2010.

(51) Int. Cl.
G06F 15/173 (2006.01)
H04L 12/26 (2006.01)
H04L 12/24 (2006.01)
H04L 29/08 (2006.01)
H04L 29/12 (2006.01)

(52) U.S. Cl.
CPC ........ *H04L 12/2697* (2013.01); *H04L 41/0273* (2013.01); *H04L 43/50* (2013.01); *H04L 67/02* (2013.01); *H04L 67/2814* (2013.01); *H04L 67/2876* (2013.01); *G06F 15/173* (2013.01); *H04L 29/12047* (2013.01); *H04L 61/15* (2013.01)

(58) Field of Classification Search
USPC ................. 709/223, 230, 219, 224; 713/200; 726/200
See application file for complete search history.

(56) References Cited

U.S. PATENT DOCUMENTS

| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |

(Continued)

OTHER PUBLICATIONS

U.S. Appl. No. 13/986,251, filed Apr. 16, 2013.

*Primary Examiner* — Helal A Algahaim
*Assistant Examiner* — Mahmoud Ismail
(74) *Attorney, Agent, or Firm* — Dergosits & Noah, LLP; Todd A. Noah

(57) ABSTRACT

Embodiments are described for a system and method for testing a plurality of web resources, such as web sites and/or web servers in a distributed client-server computer network. Embodiments include a method of configuring a proxy server to forward incoming HTTP requests back to a fixed port on the IP address of the sender of the incoming HTTP request to effectively remove the requirement of domain name resolution from the test environment. A reflective proxy server reflects requests from a source IP address back to that same IP address on a specific port on the testing computer to permit the testing of arbitrary web site domain names without performing DNS resolution at any step in the process, thus removing the need to modify the testing computer's host's file.

20 Claims, 4 Drawing Sheets

(56) References Cited

U.S. PATENT DOCUMENTS

| | | | |
|---|---|---|---|
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier |
| 6,631,408 | B1 * | 10/2003 | Welter et al. ............. 709/223 |
| 6,654,032 | B1 | 11/2003 | Zhu |
| 6,658,463 | B1 * | 12/2003 | Dillon et al. ............. 709/219 |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,340,411 | B2 | 3/2008 | Cook |
| 7,356,482 | B2 | 4/2008 | Frankland et al. |
| 7,401,094 | B1 | 7/2008 | Kesler |
| 7,620,655 | B2 | 11/2009 | Larsson |
| 7,698,160 | B2 | 4/2010 | Beaven et al. |
| 7,779,475 | B2 | 8/2010 | Jakobson et al. |
| 7,851,004 | B2 | 12/2010 | Hirao et al. |
| 8,010,663 | B2 | 8/2011 | Firminger et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven et al. |
| 8,095,594 | B2 | 1/2012 | Beaven et al. |
| 8,209,308 | B2 | 6/2012 | Jakobson et al. |
| 8,275,836 | B2 | 9/2012 | Beaven et al. |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 2001/0044791 | A1 | 11/2001 | Richter et al. |
| 2002/0072951 | A1 | 6/2002 | Lee et al. |
| 2002/0078371 | A1 * | 6/2002 | Heilig et al. ............. 713/200 |
| 2002/0082892 | A1 | 6/2002 | Raffel |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2004/0001092 | A1 | 1/2004 | Rothwein et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes Leon et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2005/0267976 | A1 * | 12/2005 | Chang et al. ............. 709/230 |
| 2008/0209028 | A1 * | 8/2008 | Kurup et al. ............. 709/224 |
| 2009/0063415 | A1 | 3/2009 | Chatfield et al. |
| 2009/0100342 | A1 | 4/2009 | Jakobson |
| 2009/0177744 | A1 | 7/2009 | Marlow et al. |
| 2012/0233137 | A1 | 9/2012 | Jakobson et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2014/0359537 | A1 | 12/2014 | Jakobson et al. |
| 2015/0007050 | A1 | 1/2015 | Jakobson et al. |
| 2015/0095162 | A1 | 4/2015 | Jakobson et al. |
| 2015/0172563 | A1 | 6/2015 | Jakobson et al. |

* cited by examiner

METHOD AND SYSTEM FOR TESTING MULTIPLE COMPONENTS OF A MULTI-TENANT, MULTI-DOMAIN, MULTI-TIERED WEBSITE

CLAIM OF PRIORITY

This application claims the benefit of U.S. Provisional Patent Application 61/352,311 entitled METHODS AND SYSTEMS FOR TESTING MULTIPLE COMPONENTS OF A MULTI-TENANT, MULTI-DOMAIN, MULTI-TIERED WEBSITE, by Steven S. Lawrance, et al., filed Jun. 7, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to web site deployment and maintenance, and more specifically to testing multiple components in a multi-domain website environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Large enterprise organizations often maintain many different web servers and web sites that provide comprehensive user access to their goods and services. For such organizations, web site maintenance can involve the constant deployment, testing, and updating of a multitude of web sites and web pages, and often requires a dedicated information technology (IT) department within the company. For a company that maintains many web servers and sites, such maintenance tasks can represent a high overhead burden for the IT resources of the company.

Web sites are generally accessed by users entering domain names, such as "www.salesforce.com" into a web browser. Internet connections do not work directly with domain names, so domain names are converted into corresponding IP (Internet Protocol) addresses (e.g., "192.168.1.1") by a domain name resolution process. Operating systems usually include a "hosts" file, or similar file, to map domain names to corresponding IP addresses. The hosts file is typically a plain-text file that identifies and locates a web site host in an IP network by translating the human-friendly domain names into numeric IP addresses. A typical hosts file contains lines of text consisting of an IP address in the first text field followed by one or more hostnames (domain names) with comment lines that may be included. Unlike other domain name resolution systems, such as the Domain Name System (DNS), the hosts file is usually under the direct control of the local computer's administrator. Modifying the hosts file to add, delete, change, or update web servers in the system, thus requires direct manual input by the system administrator or other IT personnel.

It is clearly desirable to test web sites prior to deployment in order verify functionality and to minimize the risk of user dissatisfaction. Under present domain name resolution systems and web server testing methods, testing arbitrary web sites that are known only to a locally running server software program requires either manual modifications to the system's hosts file or a special DNS server that returns the "localhost" Internet protocol (IP) address for unknown names. Modifying the system's hosts file (e.g., /etc/hosts), requires that all hostnames that the tester wants to test be listed in that file to resolve to the "localhost" IP address. Running a specially configured DNS server requires either creating or modifying an existing DNS server program to return the localhost IP address instead of an error message or "not-found" message for the DNS domain names that are not known. Requiring manual modification of the hosts file in this manner can impose an unacceptable burden to an organization if there are many web sites to maintain and test at any one time.

Accordingly, it is desirable to provide techniques enabling efficient testing of multiple web sites and/or web servers without requiring manual modification of operating system hosts files.

BRIEF SUMMARY

In an embodiment and by way of example, there are provided mechanisms and methods for providing a testing scheme for multiple web servers and/or web sites without requiring manual modification of operating system hosts files.

Embodiments include a method of configuring a proxy server to forward incoming HTTP requests back to a fixed port on the IP address of the sender of the incoming HTTP request. This process effectively removes domain name resolution from the test environment. A test routine utilizes a reflective proxy server to allow HTTP clients, such as web browsers, to send domain names to a server program that can serve multiple web sites on demand based on the requested domain name. The reflective proxy server removes the necessity of performing any type of DNS resolution, thus obviating the need to either modify the local system's "hosts" file or set up a specially modified DNS server.

Embodiments further include a web-based client-server system that includes a specially configured proxy server to allow developers and quality assurance teams to test caching layers, application servers, and other similar functions on their computer systems. The specially configured proxy reflects requests from a source IP address back to that same IP address on a specific port, which permits the testing of arbitrary web site domain names without performing DNS resolution at any step in the process, thus removing the need to modify the test computer's hosts file.

While one or more implementations and techniques are described with reference to an embodiment in which a method for providing an efficient test scheme for multiple web sites and web servers is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for methods for providing an efficient method for testing multiple web sites and web servers in a distributed client-server computer environment. Mechanisms and methods for providing methods for providing an adaptive input user interface will be described with reference to example embodiments.

In an embodiment, a distributed client-server system includes a specially configured proxy server to allow developers and quality assurance personnel to test web sites, caching layers, application servers, and other components on their computer systems. The specially configured proxy server ("reflective proxy server") is configured to reflect requests from a source IP address back to that same IP address on a specific port. This permits the testing of arbitrary website URL (uniform resource locators) without requiring a DNS resolution at any step in the process, thus removing the need to modify the testing machine's hosts file.

Figure 1:
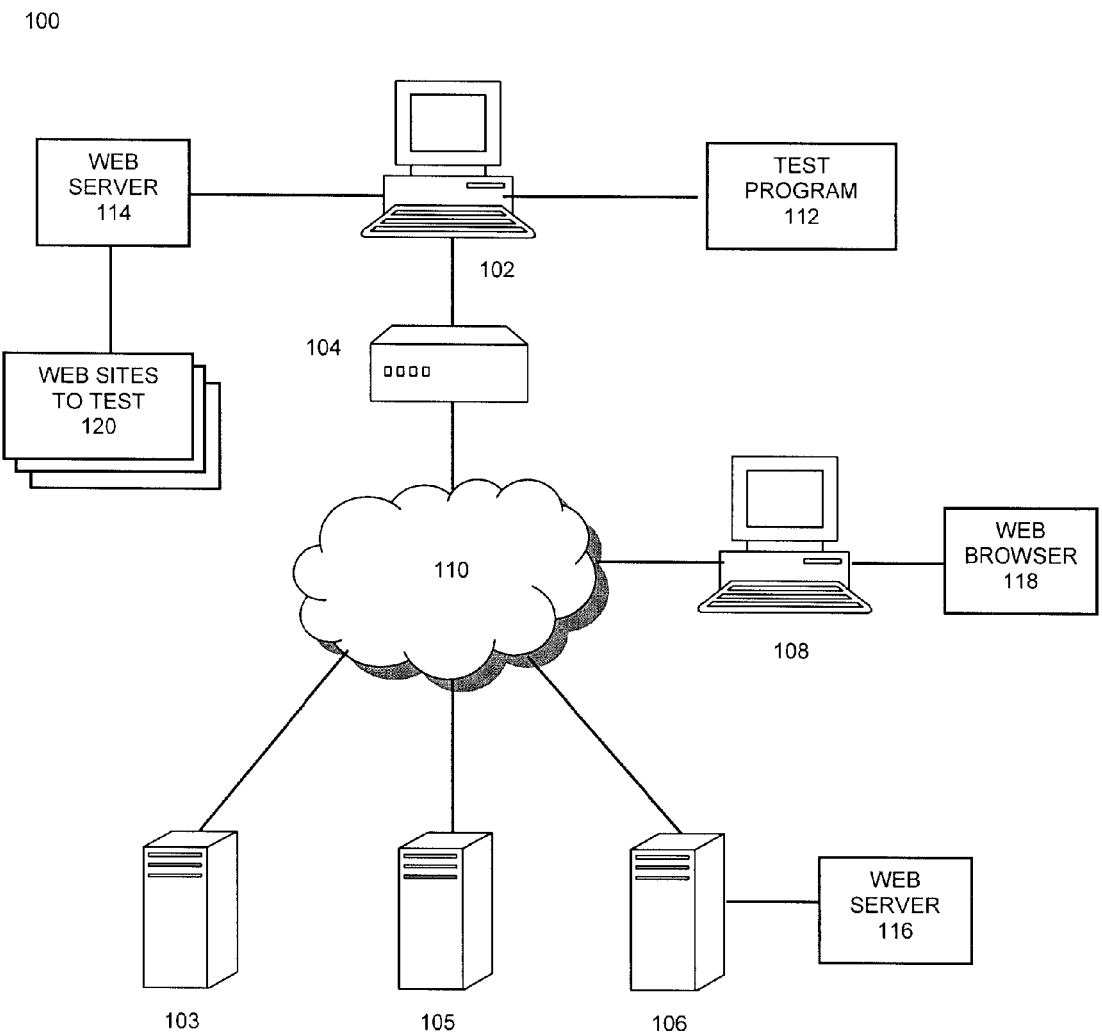
FIG. 1 illustrates a computer network system 100 that implements one or more embodiments

Aspects of the one or more embodiments described herein may be implemented on one or more computers executing software instructions. The computers may be networked in a client-server arrangement or similar distributed computer network. FIG. 1 illustrates a computer network system 100 that implements one or more embodiments. In system 100, a network server computer 104 is coupled, directly or indirectly, to one or more network client computers 102 through a network 110. The network interface between server computer 104 and client computer 102 may include one or more routers that serve to buffer and route the data transmitted between the server and client computers. Network 110 may be the Internet, a Wide Area Network (WAN), a Local Area Network (LAN), or any combination thereof.

The testing computer 102 of system 100, as well as the client computer 108 may be a workstation computer or it may be a computing device such as a notebook computer, personal digital assistant, or the like. The server computers 103, 105, 106 may likewise be implemented within any suitable networkable computing device, such as server-class computers, workstations, personal computers, or any similar device capable of hosting applications accessed over network 110.

At least one of the server computers 106 may be a World-Wide Web (WWW) server that stores data in the form of web pages and transmits these pages as Hypertext Markup Language (HTML) files over the Internet 110 to client computers, such as client 108. For this embodiment, the client computer 108 typically runs a web browser program 118 to access the web pages served by server computer 106 and any available content provider or supplemental server. In a web-based network in which network 110 is the Internet, network server 106 executes a web server program 116 to provide HTML documents, typically in the form of web pages, to client computers coupled to the network. To access the HTML files provided by server 106, client computer 108 executes the web browser process to access web pages available on server 106 and other Internet server sites, such as other content providers.

FIG. 1 illustrates a client-server computer system that implements a reflective proxy server for testing multiple web sites, servers, or applications, under an embodiment. As shown in FIG. 1, system 100 includes a user computer 102 that is used by a technician to test one or more components of the servers 103, 105, 106 in the system. These components may be processes, applications, or hardware elements implemented on or embodied in one or more of the server computers that are coupled to the user (or "testing") computer 102 over network 110. For example, in a web-based environment, the testing computer may be used to test a number of different web servers 106 or a number of web sites 120 served by one or more of the servers. The testing computer can also be used to test applications or processes that involve IP access through URLs or similar IP address locators.

In an embodiment, the testing computer 102 executes one or more test programs 112 that may be part of an overall routine to test the functionality of the servers 106. To test a web server or web site, the testing computer accesses and loads the target website 120 through a resident web server program 114 and then an automated process tests the functionality of the website. Alternatively, the user can view the website and manually check to see whether the tested functionality operates as expected. The test programs access the servers 106 or specific web pages served by the servers through appropriate domain names (URLs) that are converted to corresponding IP addresses by a domain resolution process. In an embodiment, the test system 100 includes a reflective proxy server 104 that reflects incoming HTTP requests from the testing computer 102 back to a defined IP port address. As is generally known, during a web browsing session, a port (TCP/IP port) is a number assigned to user sessions and server applications in an IP network. The port number resides in the TCP or UDP header of the packet. The destination port is used to route packets on a server to the appropriate network application. For example, port 80 is the standard port number for HTTP traffic, and port 80 packets are processed by a web server.

In general, a proxy server is a computer or application that acts as an intermediary for requests from network clients seeking resources from other servers. A client connects to the proxy server, requesting some service, such as a file, connection, web page, or other resource, available from a networked server. The proxy server evaluates the request according to certain defined filtering rules, such as filtering traffic by IP address or protocol. If the request is validated by the filter, the proxy provides the resource by connecting to the relevant server and requesting the service on behalf of the client.

In an embodiment, reflective proxy server 104 is embodied in a separate server computer that operates independently of testing computer 102 and server 106. Alternatively, reflective proxy server 104 may be embodied as an application program that is executed on testing computer 102 as a standalone application or as part of test program 112. It may also be embodied as a process executed on a separate networked computer, such as client computer 108 or a server 106.

The reflective proxy server 104 is configured only to redirect or reflect the incoming HTTP requests. It is not configured to alter the testing computer's request or the server's response. The proxy server may cache responses from the remote server, and return subsequent requests for the same content directly to the testing computer.

In an embodiment, the proxy server 104 is configured to reflect incoming HTTP requests for any URL issued by the testing computer 102 back to the testing computer 102 onto a defined port. In an example, the proxy port is assigned to IP port 8084, which is a currently unassigned registered port that is reserved for proprietary applications. Any other appropriate port number may be used, but for purposes of discussion, port 8084 will be used as the fixed port for the reflected proxy server.

Figure 2:
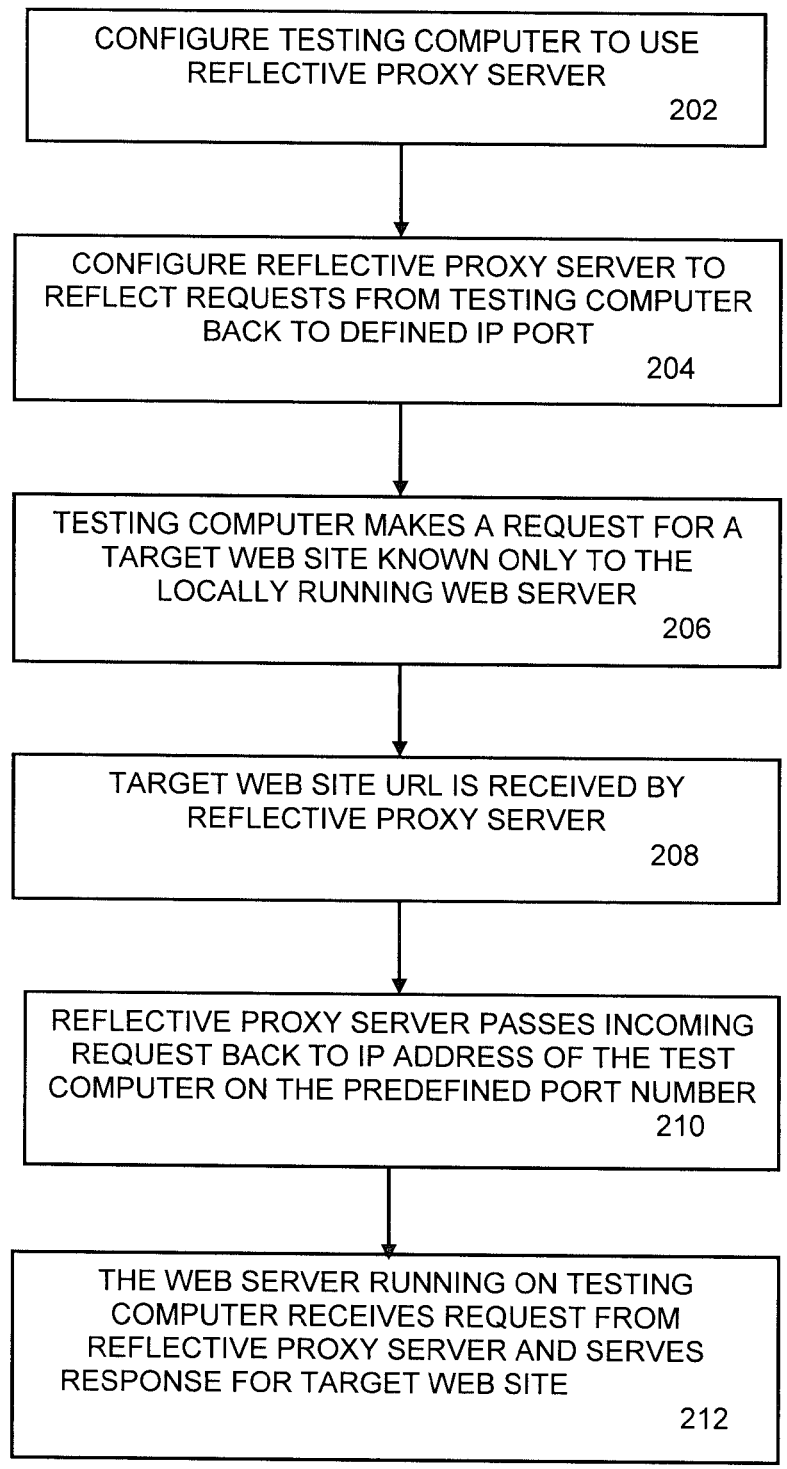
FIG. 2 is a flowchart that illustrates a multiple component testing scheme using a reflective proxy, under an embodiment.

FIG. 2 is a flowchart that illustrates a multiple component testing scheme using a reflective proxy, under an embodiment. As shown in process 200, a testing computer 102 includes a web browser or HTTP client process that is configured to use a reflective proxy server, block 202. On the same computer as the HTTP client, a web server program that can serve multiple web sites is started and listens on a TCP port that the proxy server is configured to reflect requests back to, such as port 8084. Thus, as shown in FIG. 1, testing computer 102 serves the web sites to test 120 through a resident web server program 114, and also runs the test program to test the web sites. The test program 112 comprises part of the HTTP client process that initiates HTTP requests to the target web sites 120 and/or the target web servers 106 or other servers 103, 105. The reflective proxy server is configured to know the defined port number so that it knows which port number to reflect requests back to, as shown in block 204.

The HTTP client makes a request for a web site that only the locally running web server program 114 knows about, block 206. For example, the requested web site may be "http://example.com". Because the HTTP client is configured to use a HTTP proxy server, the "example.com" name is not resolved to an IP address by the HTTP client. Instead, it sends a request for http://example.com/ to the reflective proxy server, block 208. The reflective proxy server passes the incoming request back to the IP address of the requesting testing computer on the pre-defined port number (e.g., port 8084), block 210. The proxy server is configured to preserve the requested host name, such as example.com in the forwarded request so that this information is not lost. The proxy server thinks that it is passing the request and the name resolution responsibility to another server, so DNS resolution does not take place on the proxy server.

The web server program that is running on the same computer as the HTTP client receives the request from the proxy server and serves the proper response for the requested web site, block 212. In this process, the domain/host name of the requested web site is passed in from the proxy server via the "Host" HTTP request header.

In one embodiment, the reflective server is implemented using an Apache httpd web serve (e.g., Apache httpd version 2.2.9 or higher). As used in industry, httpd is the Apache HyperText Transfer Protocol (HTTP) server program, and is designed to be run as a standalone daemon process. The reflective proxy server implements the specific Apache configuration directive "ProxyPassInterpolateEnv" that is available in the 2.2.9 version of Apache httpd. The directive can be used in both forward and reverse proxy systems.

This directive, together with the "interpolate" argument to the ProxyPass, ProxyPassReverse, ProxyPassReverseCookieDomain and ProxyPassReverseCookiePath directives enables reverse proxies to be dynamically configured using environment variables, which may be set by another module such as "mod_rewrite." It affects the ProxyPass, ProxyPassReverse, ProxyPassReverseCookieDomain, and ProxyPassReverseCookiePath directives, and causes them to substitute the value of an environment variable "varname" for the string ${varname} in configuration directives.

In an embodiment, the reflective proxy may execute program code that incorporates the ProxyPassInterpolateEnv function. An example of such program code is as follows:

```
Listen 8084
<VirtualHost *:8084>
    ProxyRequests Off
    ProxyPreserveHost On
    ProxyPassInterpolateEnv On
    SetEnvIf Remote_Addr "([0-9.]+)" remote-address=$1
    ProxyPass / http://${remote-address}:8084/ interpolate
    <Proxy *>
        Order deny,allow
        Deny from none
        Allow from all
    </Proxy>
</VirtualHost>
```

The ProxyPassInterpolateEnv directive enables the "remote-address=$1" to be defined. It also allows any environment variable in Apache to be substituted when the "interpolate" keyword exists at the end of the ProxyPass directive. In this case, the remote address is an environment variable that can be used, and is set to the defined port, 8084. In the above sample code section, it should be noted that the 8084 port number is simply a placeholder for any valid TCP port number. Any appropriate IP port number other than port 8084 may be used depending on system configurations.

In order to implement the hostname redirection through the reflective proxy, certain defined HTTP headers can be injected into the header of the targeted request header from the testing computer. In an embodiment, the X-Forwarded-For request header is set to the IP address of the testing computer. The localhost is the testing computer 102 that executes both the testing routine 112 and a web server program 114.

Figure 3:
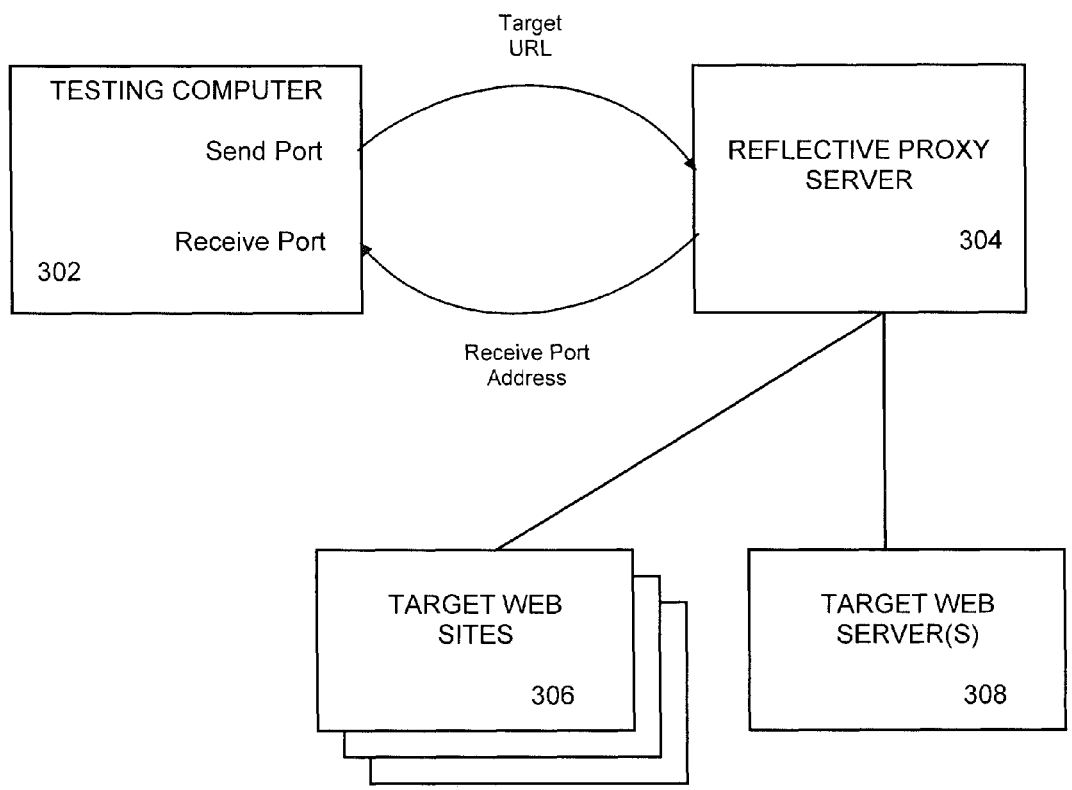
FIG. 3 illustrates the redirection of a hostname through a reflective proxy server for testing multiple web resources, under an embodiment.

FIG. 3 is a block diagram that illustrates the redirection of a hostname through a reflective proxy server for testing multiple web resources, under an embodiment. As shown in FIG. 3, the HTTP client embodied in testing computer 302 makes a request for a target web site 306 to test. Such a request may be generated by a test routine 112. The target web site may be served by a separate web server 308, or it may be a web site that is served locally by the testing computer through a resident web server process. The target web servers 308 may be configured to host multiple web sites that are served through the port number that the reflective proxy server utilizes.

The testing computer transmits the target URL for the hostname of the target. In an embodiment, the target is a resource that only the locally running web server program 114 knows about (e.g., "http://example.com" for the requested web site). The request is transmitted to reflective proxy server 304, which passes the incoming request back to the receive port IP address of the requesting testing computer 302 on the pre-defined port number (e.g., port 8084). As stated above, the reflective proxy server 304 is configured to preserve the requested host name (e.g., www.example.com) in the forwarded request, and thus pass the request and the name resolution responsibility to another server. Thus, no DNS resolution takes place on the reflective proxy server 304 itself. The test routine executed on testing computer 302 can then evaluate the served web site using the defined test programs.

Embodiments of the reflective proxy to test multiple components on one or more servers may be used in a virtual machine network system. For testing using multiple web browsers on multiple operating systems, virtual machines that are running on the same machine as the web server program can be used and configured to use the reflective proxy server. The virtual machines will need to have their network configuration set up to use network address translation (NAT) so that the proxy server will see the virtual machine's HTTP requests as coming from the IP address of the machine that is running the web server program. This permits different versions of web browsers across multiple operating system platforms to be tested without having to modify any "hosts" files or run a specially modified DNS server.

In an alternative embodiment, further configuration on the proxy server or on the HTTP client can be performed to not reflect back requests for web sites that are not hosted by the web server program. An example of this is to use a web browser extension that uses the proxy server only for known hosts that the server software tester wants to send to the web server software. Other HTTP requests would thus not be reflected back to the locally running web server program. In general, web browser extensions extend the functionality of the web browser. Certain web browser extensions utilized by the testing computer can be used to modify or facilitate aspects of the reflective proxy operation. For example, the testing routine can be configured to use a particular reflective proxy based on the requested web site. In this case a plurality of different reflective proxies can be configured to redirect HTTP requests based on definitions within the testing routine. Web browser extensions can also be used to perform specific redirections within the reflective proxy. For example, extensions can be used to facilitate pattern matching on top level domain, second level domain or full URL addresses within the reflective proxy. Other similar request direction mechanisms can also be implemented using different web browser extensions in conjunction with the reflective proxy server.

In another alternative embodiment, the reflective proxy server could be configured to perform a domain name (DNS) resolution and forward the request back to the requestor's IP address only when the domain name resolution fails.

Although embodiments are described in relation to the Apache httpd version 2.2.9 implementation, it should be noted that the function of the reflective proxy server may be implemented using proprietary code that simulates or corresponds to the appropriate directives of the Apache httpd system.

Embodiments utilizing the reflective proxy server leverage a web browser's ability to delegate domain name lookups to a proxy server. The reflective proxy server is configured to direct the request back to the predefined IP port on the testing computer, rather than send the request out to the Internet. Web browsers that are configured to operate in conjunction with the configured reflected proxy server include Microsoft® Internet Explorer™, Google® Chrome™ and Mozilla® Firefox™, among other web browsers.

System Overview

Embodiments of the reflective proxy server for testing of multiple web resources can be used in any number IP based network environments. One such environment is a distributed database application that is implemented over a local or wide area network. One example of such an application is a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Figure 4:
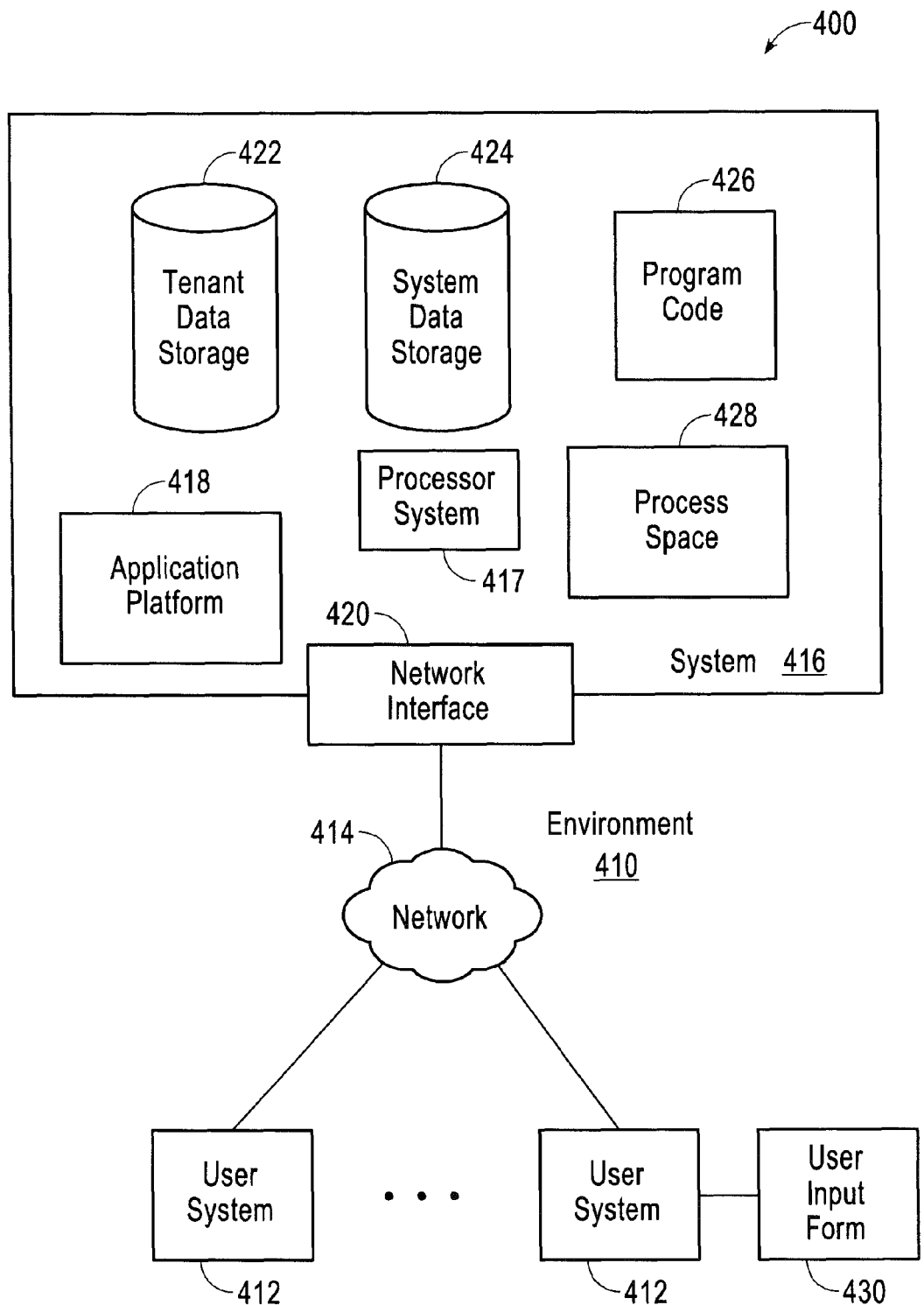
FIG. 4 is a block diagram illustrating an example of an on-demand database service implementing an embodiment of a reflective proxy server.

FIG. 4 is a block diagram illustrating an example of an on-demand database service implementing an embodiment of a multi-resource test system for testing multiple web serves and/or web sites in the system. FIG. 4 generally illustrates an overall system 400 that includes an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4, user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the terms "on-demand database service 416" and "system 416" may be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 612, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, web pages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, the system may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Depending on the size of the system, a large number of different web sites and web servers may be implemented within system 416. These resources are subject to continual maintenance and evaluation to stay operational. As such, new web pages and servers need to be tested on a routine or at least an as-needed basis to ensure constant functionality. One or more resources within network 400, such as dedicated user system can be configured to perform or execute one or more test routines 430 to test various web components (e.g., servers or web pages) within system 416. For the embodiment of FIG. 4, the testing routine 430 includes a proxy server process or access to a separate proxy server that is configured to operate as a reflective proxy server in accordance to embodiments described above. Such a reflective proxy server redirects HTML request generated by the test routine to access the target web sites or web servers to be tested. The reflective proxy server allows the target web sites to be served without requiring DNS resolution to be performed. This eliminates the need to modify the local user system hosts file to access the target web sites. For a network environment with a multitude of different web resources, the use of a reflective proxy server to access many web sites to be tested instead of modifying the hosts file or files for each target web site represents a resource savings that can be realized by the testing routine 430.

One arrangement for elements of system 416 is shown in FIG. 4, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide web pages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

In certain embodiments, user systems 412 (which may be client systems) communicate with application servers to request and update system-level and tenant-level data from system 416 that may require sending one or more queries to tenant data storage 422 and/or system data storage 424. System 416 may automatically generate one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

For the purpose of the present description, a data object is any type of distinguishable data or information, such as an image, video, sound, text, or other type of data. A data object may include multiple types of distinguishable data, such as an image combined with descriptive text, and it may also comprise a dynamic signal such as a time varying signal. A data object as used herein is to be interpreted broadly to include stored representations of data including for example, digitally stored representations of source information. A data set is a collection of data objects, and may comprise a collection of images, or a plurality of text pages or documents. A user is utilized generically herein to refer to a human operator, a software agent, process, or device that is capable of executing a process or control.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of testing a plurality of web resources in a distributed client-server computer network, the method comprising:
   receiving, by a proxy server computer, an HTTP (hypertext transport protocol) request for a web resource, the HTTP request transmitted from an Internet Protocol (IP) address associated with a port of a testing computer, the port associated with the proxy server, the HTTP request including a plaintext domain name associated with the web resource, the testing computer coupled to the proxy server in an IP network; and
   transmitting the HTTP request, to the testing computer from which the HTTP request was received, by the proxy server based on the IP address associated with the port of the testing computer, the HTTP request received from the proxy server including the plaintext domain name associated with the web resource.

2. The method of claim 1, wherein the web resource is associated with a web server program configured to monitor the port to detect the HTTP request received from the proxy server.

3. The method of claim 2, wherein the web server program is resident in the testing computer.

4. The method of claim 3 wherein the website is known only to the web server program, and wherein the web server is configured to provide information associated with the web resource based on detecting the HTTP request received from the proxy server.

5. The method of claim 4, wherein the plaintext domain name associated with the web resource is included in a portion of the header of the HTTP request received from the proxy server.

6. The method of claim 4 wherein the testing computer is configured to activate a web browser program to request for the information associated with the web resource, and wherein the web browser program includes a browser extension to allow redirection of the HTTP request through the proxy server based on one or more pre-defined rules.

7. The method of claim 6 wherein the browser extension allows for filtering and routing of the HTTP request to the proxy server from a plurality of proxy servers based on a characteristic of the HTTP request.

8. The method of claim 7 wherein the characteristic of the HTTP request comprises at least one of domain level and identity of the target resource.

9. An apparatus for testing a plurality of web pages in a distributed client-server computer network, the apparatus comprising:
   a proxy server coupled to a testing computer via an IP network, the testing computer being configured to test a plurality of web pages associated with at least one web server program, the proxy server being configured to reflect an HTTP request received from the testing computer back to the testing computer from which the HTTP request was received, wherein a same port is used at the testing computer to transmit the HTTP request to the proxy server and to receive the HTTP request from the proxy server, and wherein the HTTP request is received from the proxy server without an IP address translated from a plaintext domain name associated with a web page.

10. The apparatus of claim 9, wherein the HTTP request transmitted from the testing computer includes the plaintext domain name associated with the web page, and wherein the HTTP request received from the proxy server includes the same plaintext domain name.

11. The apparatus of claim 10, wherein the proxy server is configured to transmit the HTTP request back to the testing computer using an IP address associated with the port.

12. The apparatus of claim 11, wherein the plaintext domain name associated with the web page is included in a portion of a header of the HTTP request.

13. The apparatus of claim 12, wherein the testing computer is configured to activate a web browser program to request for information associated with the web page, and wherein the web browser program includes a browser extension to allow redirection of the HTTP request through the proxy server based on one or more pre-defined rules.

14. The apparatus of claim 13, wherein the browser extension allows for filtering and routing of the HTTP request to the proxy server from a plurality of proxy servers based on a characteristic of the HTTP request, and wherein the characteristic of the HTTP request comprises at least one of domain level and identity of the target resource.

15. A non-transitory machine-readable medium carrying one or more sequences of instructions for testing a plurality of web pages in a distributed client-server computer network, which instructions, when executed by one or more processors, cause the one or more processors to carry out the steps of:
   receiving, by a proxy server computer, an HTTP (hypertext transport protocol) request for a web page, the HTTP request transmitted from an Internet Protocol (IP) address associated with a port of a testing computer, the HTTP request including a plaintext domain name associated with the web page, the testing computer coupled to the proxy server via a network; and
   transmitting the HTTP request by the proxy server at the IP address associated with the port of the testing computer from which the HTTP request was received, the port associated with the proxy server, the HTTP request received from the proxy server including the plaintext domain name associated with the web page.

16. The non-transitory machine-readable medium of claim of claim 15, wherein the plaintext domain name associated with the web page is included in a portion of a header of the HTTP request.

17. The non-transitory machine-readable medium of claim 16, wherein the testing computer is configured to activate a web browser program to request for information associated with the web page, and wherein the web browser program includes a browser extension to allow redirection of the HTTP request through the proxy server based on one or more predefined rules.

18. The non-transitory machine-readable medium of claim 17, wherein the browser extension is configured to enable filtering and routing of the HTTP request to the proxy server from a plurality of proxy servers based on a characteristic of the HTTP request.

19. The non-transitory machine-readable medium of claim 18 wherein the characteristic of the HTTP request comprises at least one of domain level and identity of the target resource.

20. The non-transitory machine-readable medium of claim 19, wherein the information associated with the webpage is provided by a web server program associated with the testing computer.

* * * * *